US011447633B2

(12) United States Patent
Chen

(10) Patent No.: US 11,447,633 B2
(45) Date of Patent: Sep. 20, 2022

(54) METHOD FOR PRODUCING A COLD RESISTING AND HEAT INSULATING COMPOSITE GLUE COMPOSED OF A HYDROPHOBIC AEROGEL AND THE RELATED PRODUCT THEREOF

(71) Applicant: Taiwan Aerogel Technology Material Co., Ltd., Tainan (TW)

(72) Inventor: Jean-Hong Chen, Tainan (TW)

(73) Assignee: TAIWAN AEROGEL TECHNOLOGY MATERIAL CO., LTD., Tainan (TW)

( * ) Notice: Subject to any disclaimer, the term of this patent is extended or adjusted under 35 U.S.C. 154(b) by 361 days.

(21) Appl. No.: 16/858,953

(22) Filed: Apr. 27, 2020

(65) Prior Publication Data

US 2021/0332242 A1    Oct. 28, 2021

(51) Int. Cl.
   *C08L 83/06* (2006.01)
   *F16L 59/02* (2006.01)
(52) U.S. Cl.
   CPC .............. *C08L 83/06* (2013.01); *F16L 59/028* (2013.01); *C08L 2201/08* (2013.01)
(58) Field of Classification Search
   None
   See application file for complete search history.

(56) References Cited

U.S. PATENT DOCUMENTS

| 6,103,209 A * | 8/2000 | Balducci ............... C01B 33/163 423/338 |
| 10,563,016 B2 * | 2/2020 | Kotake ................... C08G 77/14 |
| 10,590,001 B2 * | 3/2020 | Kotake ..................... B32B 9/00 |
| 10,995,184 B2 * | 5/2021 | Iwanaga ............. B01J 13/0021 |
| 11,326,055 B2 * | 5/2022 | Makino .................... C08K 3/36 |
| 2021/0115266 A1 * | 4/2021 | Izumi .................... C09D 133/06 |

FOREIGN PATENT DOCUMENTS

WO    WO-2019202635 A1 * 10/2019 ........... C09D 133/04

OTHER PUBLICATIONS

Yoo et al. "Synthesis of silica aerogel thin sheets and evaluation of its thermal, electrical, and mechanical properties." International Journal of Applied Ceramic Technology 16.2 (2019): 832-842. (Year: 2019).*

* cited by examiner

Primary Examiner — Robert S Loewe
(74) Attorney, Agent, or Firm — WPAT, PC

(57) ABSTRACT

A method for producing a composite glue composed of a hydrophobic aerogel according to the present invention includes: (S1) mixing step; (S2) hydrolysis step; (S3) condensation step; (S4) aging step; (S5) high-temperature pulse washing step; (S6) drying step; and (S7) composition step. The obtained composite glue composed of a hydrophobic aerogel is high-viscosity glue made by blending the hydrophobic aerogel with an inorganic fiber, and the related product not only has good properties of cold resisting and heat insulating, but also is light and has appropriate strength, excellent flame retardancy, and excellent water repellency.

16 Claims, 7 Drawing Sheets

METHOD FOR PRODUCING A COLD RESISTING AND HEAT INSULATING COMPOSITE GLUE COMPOSED OF A HYDROPHOBIC AEROGEL AND THE RELATED PRODUCT THEREOF

FIELD OF THE INVENTION

The present invention relates to a method for producing a cold resistant and heat insulating composite glue composed of a hydrophobic aerogel and the related product thereof, wherein such composite glue is of the cold resistance, heat insulation and water repellent properties, and in particular, to a method for producing an aerogel composite glue and relevant products thereof, wherein such composite glue is able to withstand high and low temperatures ranging from −200° C. to 300° C.

BACKGROUND OF THE INVENTION

Aerogel refers to a porous material having a geometrical network structure, and it is a high-tech product with the characteristics of low density (0.003 to 0.2 g/cm$^3$), high specific area (500~2,000 m$^2$/g) and low thermal conductivity (0.02 to 0.036 w/mK). Since the porosity of aerogel can reach above 95% and its internal contains a great amount of air, it therefore has an overall transparent appearance and the characteristics of low thermal conductivity coefficient, low acoustic transmission speed and low dielectric constant, making aerogel as a material with the properties of excellent heat insulation, soundproof, electrical insulation, high absorbing and highly effective filtering material. Nevertheless, to achieve the foregoing functions during use in practice, it is necessary to uniformly distribute aerogel onto a substrate of rockwool, glass fiber cotton or carbon fiber cotton in order to form an aerogel heat insulation blanket. Common aerogel heat insulation blankets are subject to the problem of loose powder, and when they are repetitively used under the temperature interval between −200° C. and 300° C., water molecules are likely to infiltrate into the aerogel heat insulating blanket when it is close to the freezing point temperature such that ice is formed inside the blanket. Consequently, the pipes laid inside the aerogel heat insulating blanket are subject to rust or damages of the heat insulating blanket structure. In addition, common aerogel heat insulating blankets typically use a conventional organic binding agent to bond with the aerogel powder. Consequently, under the high temperature of 300° C., the organic binding agent starts to degrade and release a great amount of toxic gas or odor. Furthermore, the aerogel heat insulating blankets can generate obvious degradation such that its heat insulation effect is significantly reduced. The foregoing occurrence is likely cause corrosion of the pipes laid inside the aerogel heat insulating blanket or cause damages to personnel or the environment. In view of the above, it can be understood that for the ocean fishing industry, fresh food transportation industry and low-temperature manufacturing related industries, there is a need for a low-temperature and heat-insulating innovative product with excellent heat insulation property and capable of preventing fire under high temperature.

A known aerogel production method is based on a sol-gel synthetic method. It mainly mixes the precursors of alkoxysilane, methyl silicate or sodium silicate with an organic solvent, followed by addition of acid catalyst in order to perform the hydrolysis. For a certain period of hydrolysis, basic catalyst is further added to perform the condensation, and sol is gradually formed during the condensation process. The molecules in the sol continues to perform bonding, and semisolid polymeric gel is gradually formed. Next, after a period of aging, the gel then forms a geometrical network structure of a stable structure. Finally, the solvents of n-butanol, n-hexanol, n-hexane, or cyclohexane is further used to perform the solvent replacement. Then, the supercritical drying technique is applied to dry off the solvent inside the geometrical network structure in order to obtain porous aerogel powder that is dry and hydrophobic.

The method for producing a hydrophobic aerogel is also based on the sol-gel synthesis. First, it mainly mixes the precursor of alkoxysilane (such as, methyltrimethoxysilane (MTMS) or methyltriethoxysilane (MTES)) with an organic solvent, followed by the addition of an acid catalyst to perform the hydrolysis. For a certain period of hydrolysis, condensation reaction is performed, and sol is gradually formed during the condensation process. Next, the solvent of n-butanol, n-hexanol, n-hexane or cyclohexane is used to perform the solvent replacement. Once the solvent replacement is complete, drying is performed under normal temperature and normal pressure or under high temperature and normal pressure. Alternatively, the precursor of alkoxysilane (such as, tetraethoxysilane (TEOS) or (tetramethoxysilane (TMOS)) can be mixed with an organic solvent, followed by the addition of an acid catalyst to perform the hydrolysis. For a certain period of hydrolysis, a basic catalyst is further added to perform the condensation, and it is able to gradually form a geometrical network structure of a stable structure during the condensation process. Finally, the solvent of n-butanol, n-hexanol, n-hexane or cyclohexane is used to perform the solvent replacement first, following which the modification material of trimethyl chlorosilane or hydrophobic alkoxysilane is further used to perform the hydrophobic modification in order to allow the hydrophobic functional group structure to form chemical bonding with the geometrical network structure. At the end, the normal pressure drying technique is applied to dry off the solvent in the aerogel in order obtain a porous dry aerogel block.

Chinese Invention Patent Publication No. CN101679657B discloses aerogel particles and manufacturing method thereof, which specifically discloses aerogel particles of an average particle size smaller than 1 micrometer, products containing such aerogel particles, a method for manufacturing such aerogel particles and the purpose of use of such aerogel particles. According to the manufacturing method disclosed, homogenization or wet grinding is performed on the aerogel particles, and surface treatment can be performed on the aerogel starting particles during the grinding process period in order to prevent coagulation or aggregation. The aerogel particles obtained has the following characteristics: (1) contain silicone particles; (2) at least 80% with a particle size smaller than 1 micrometer; (3) average particle size is 0.1 micrometer to 1 micrometer; and (4) equipped with the hydrophobic property. During the production of such hydrophobic aerogel particles, it is necessary to utilize grinding process to homogenize or wet grind the aerogel, such that the process cannot be operated easily and is not cost effective.

Chinese Invention Patent Publication No. CN104556969A discloses a method for producing hydrophobic silicon dioxide aerogel heat insulating composite material, and it specifically comprises the following steps: (1) preparation of silicone dioxide sol: using the precursor of siloxane, and adding an organic solvent, water and an acid catalyst therein in order to obtain silicon dioxide sol; (2) preparation of composite gel: adding a flame retardant, an infrared blocker into the silicon dioxide sol and mixing it uniformly, followed by adding a basic catalyst and then immersing the inorganic fiber product into the silicon dioxide sol for placing therein stationary; (3) solvent replacement: using an organic solvent to replace the composite gel; (4) drying: drying the composite gel. To be more specific, in this prior art, the inorganic fiber product is immersed into the silicon dioxide sol and is placed therein stationary for 0.01 to 72 hours under 0° C. to 80° C. in order to obtain the composite gel, followed by aging for 0 to 96 hours under 0° C. to 80° C. Subsequently, an organic solvent is used to replace the composite gel after aging, and the replacement time is approximately 1 to 48 hours with 1 to 10 times. The overall process requires long period of time such that it is not economic cost effective.

Chinese Invention Patent Publication No. CN105753388A discloses an aerogel composition and manufacturing and use method thereof, wherein the composition comprises an aerogel component and is of a low thermal conductivity. In addition, a method for producing a slurry or a composite material, comprising: selecting an aerogel component of approximately 60 to 95 vol % from an inorganic binding agent of cement, gypsum, lime or any combination thereof and combining the aerogel component with a surfactant. Furthermore, the composition obtained after drying is a self-supporting rigid composite material and is of a thermal conductivity approximately smaller than 20 mW/mK. The aerogel in this prior art is hydrophobic, and such hydrophobic aerogel is hard to be mixed uniformly with an inorganic binding agent of cement, gypsum or lime, and the drawback of the hydrophobic aerogel is that when it is used in a high temperature above 350° C., it degrades rapidly and also generates toxic smoke.

Japanese Invention Patent Publication No. JP200835648 discloses a porous material and a preparation method thereof. It mainly mixes a siloxane compound (such as, TEOS) or a silicate compound (such as, sodium silicate) with an organic solvent and uses the sol-gel for synthesis, followed by using a modifier for modification in order to obtain the porous material. Accordingly, the surface hydrophilic functional group of the porous material is replaced with the hydrophobic functional group, in order to prevent the rupture of the aerogel due to the water surface tension; consequently, it can be dried under room temperature and normal pressure.

Chinese Invention Patent Publication No. CN105025598A discloses an electric heating composite ceramic brick and a preparation method thereof, utilizing an electric heating film as a heating element, and its composition contains an organic bonding agent of 55 to 75 wt %, such as: epoxy resin, polyurethane resin, or modified silicone resin; however, such organic materials tend to release toxic gas during the heating process.

Currently, relevant cold resisting and heat insulating products available in the market mainly use an organic foam sponge or foam sponge pipes, and such porous foam materials are porous plastic structures obtained from the use of organic plastic material for the foaming process. Despite that such foaming technique is able to obtain porous organic foam sponge that is light weight and of excellent heat insulating effect, and its thermal conductivity is approximately 0.04 to 0.06 W/mK; nonetheless, its drawback is that when the use temperature under 150° C., it degrades rapidly at high temperature and generates toxic heavy smoke. Furthermore, with the use of water molecules under low temperature, the internal of the foam sponge can have water condensation, causing loss of the heat insulating effect and the internal pipes installed inside, and the sponge can suffer from severe corrosion.

Moreover, there are also some foamed porous ceramic materials being used in a cycle between the temperature interval of low temperature of −100° C. to high temperature of 300° C., and the porous ceramic plates manufactured mainly refer to foamed ceramics, honeycomb ceramics or particle ceramics structures, and all of them are silicate ceramic materials manufactured through high temperature heating. The essential structure of such porous ceramic plates is a high density ceramic structure. Despite that the use of foaming technique is able to allow the material to be light weight, thin thickness and of high flame resistance, under the low temperature water molecules condensation environment, the internal of the foamed porous ceramic material tends to have a large amount of water accumulated therein, such that its heat insulation property is reduced. Most importantly, after the internal of the porous ceramic is accumulated with a large amount of water, once the temperature is increased rapidly to a high temperature environment, it can cause the porous ceramic to burst such that the factory safety is affected. In addition, it can also cause the internal metal pipes to suffer from continuous corrosion, leading to damages of pipes. All of these occurrences can cause industrial safety accidents of leakage of raw materials in pipe operation or explosion.

SUMMARY OF THE INVENTION

An objective of the present invention is to improve the use deficiencies of known aerogel heat insulating blankets and relevant drawbacks of environmental pollution.

Another objective of the present invention is to provide an aerogel composite glue obtained from mixing a silicon dioxide aerogel material with high heat insulation and low degradation under flame with an inorganic fiber, an inorganic binder solution and an extremely small amount of water repellent. After drying such glue, an aerogel heat insulating board or heat insulating brick with ultra water repellent and high heat insulation properties can be obtained.

Still another objective of the present invention is to improve the currently available organic foam sponge or the problem of hazards to the production line and personnel injury due to rapid degradation and generation of toxic heavy smoke when such sponge is under a high temperature of 200° C. In addition, it is able to overcome the problem of accumulation of water droplets occur in the organic foam sponge under low temperature environment that can cause severe corrosion to the internal pipes.

Still another objective of the present invention is to overcome the drawbacks of a currently existing aerogel heat insulating blanket that cannot be applied to a high temperature environment. In addition, when relevant heat insulating blanket products produced from hydrophobic aerogel are used under a high temperature of 300° C., the internal hydrophobic aerogel and relevant inorganic substances start to generate thermal degradation and powdering issue.

Still another objective of the present invention is to replace the solvent commonly used in the hydrophobic aerogel production, hydrophobic modification and the expensive supercritical drying technique during the method for producing the aerogel in order to produce hydrophobic aerogel. More specific, during the production of hydrophobic aerogel, it only requires to use pulse washing technique for a short time period in order to produce aerogel products, thereby reducing the process cost and improving the production rate.

Still another objective of the present invention is to use the traditional processing technique of spraying, pressing or coating in order to apply the aerogel composite glue onto the materials of various metals, ceramics, woods or plastics with ease, thereby increasing the subsequent processing and operation convenience.

Still a further objective of the present invention is to produce an aerogel composite glue capable of being sprayed, pressed or coated onto a conventional inorganic fiber fabric or fiber blanket, e.g. glass fiber, ceramic fiber, rockwool fiber, carbon fiber or a combination of inorganic fiber blanket, in order to obtain an aerogel heat insulating blanket that is soft, water repellent and of heat insulating property, in order to be applied to indoor and outdoor heat insulation and cold resistance.

The present invention provides a method combining the techniques of siloxane compound mixing and sol-gel synthesis in order to allow the materials of a hydrophobic aerogel, inorganic fiber, inorganic binder solution and a small amount of dispersant to mix uniformly with each other in order to form a composite glue composed of a hydrophobic aerogel. Consequently, such composite material composed of a hydrophobic aerogel contains hydrophobic aerogel and hydrophilic inorganic fiber uniformly mixed with each other, in order to achieve the excellent properties of heat insulation and flam retardancy. Accordingly, the present invention provides a method for producing a composite glue composed of a hydrophobic aerogel, comprising the following steps: (1) mixing step: adding a siloxane mixture into a mixing solvent in order to allow the siloxane compound to disperse in the mixing solvent to form a uniform mixing solution; (2) hydrolysis step: adding an acid catalyst into the mixing solution to perform a hydrolysis reaction; (3) condensation step: adding a basic catalyst into the mixing solution to perform a condensation reaction, and during the condensation reaction process, adding a large amount of dispensing solvent and performing emulsion and dispersion in order to allow the condensation solution to form stable droplets in the large amount of dispensing solvent and to form a stable wet gel structure having a particle size ranging from submicron to micron level; (4) aging step: performing aging on the wet gel structure under a specific temperature range in order to promote the molecules in the wet gel structure not yet bonding with each other to further bond with each other in order to a form a network structure for a more stable wet gel structure; (5) high-temperature pulse washing step: using a large amount of pulse water under a condition of normal pressure and high temperature to perform washing in order to swiftly replace the solvent in the wet gel until it shows a milky color; (6) drying step: performing solvent evaporation and drying on the wet gel under normal pressure, and utilizing the environment of approximately 80 to 90° C. to allow the water molecules in the wet get structure to escape swiftly in order to obtain hydrophobic aerogel particles with heat insulating property; and (7) composition step: using a mixing machine to mix the evaporated and dried aerogel particles with an inorganic fiber with each other in order to form a uniformly dispersed inorganic mixture, followed by adding an inorganic binder solution in order to allow the aerogel particles, the inorganic fiber and the inorganic binder solution to interact with each other to form a composite glue composed of aerogel with a viscosity, following by adding water, a thickener, a dispersant, a water repellent or an aerogel powder to adjust the viscosity of the glue. In the glue obtained, the content of the hydrophobic aerogel particles is 35-50 v/v %, the content of the inorganic fiber is 10-25 v/v %, the content of the inorganic binder solution and the dispersant is 35-55 v/v %. In the aerogel heat insulating board obtained from the dry glue, the total content of the aerogel and the inorganic fiber is approximately 75-95 wt %.

Furthermore, the siloxane mixture comprises one or a plurality of compounds selected from a group consisting of the following: alkoxysilane compound, olefin alkoxysilane compound, and R-silicone oligo molecules; In addition, the alkoxysilane compound refers to tetramethoxysilane (TMOS) or tetraethoxysilane (TEOS); the above molecules described in this content is mainly to provide the aerogel network structure bonding point density in order to enhance the structural strength. The olefin alkoxysilane compound refers to methyltrimethoxysilane (MTMS) or methyltriethoxysilane (MTES); the above molecules described in this content is mainly to provide the aerogel hydrophobic property in order to increase the softness and to increase the environmental stability for the aerogel structure. The R-silicone oligo molecules refer to polydimethylsiloxane (PDMS) or silicone precursor (DMDMS); the above molecules described in this content is mainly to provide the aerogel elasticity and softness in order to increase the environmental stability of the aerogel structure, and the R— is linked to a functional group at a silicone molecular chain rear end.

Furthermore, the mixing solvent comprises a first component and a second component; the first component comprises one or a plurality of substances selected from a group consisting of the following: water, alcohols, aromatics and alkanes; the second component comprises one or a plurality of substances selected from a group consisting of the following: an emulsifier and a surfactant.

Furthermore, the acid catalyst used in the hydrolysis comprises one or a plurality of compositions selected from a group consisting of the following: sulfuric acid, phosphoric acid, nitric acid, and boric acid.

Furthermore, the surfactant in the mixing solvent comprises one or a plurality of compositions selected from a group consisting of the following: cationic surfactant, anionic surfactant, zwitterionic surfactant, and nonionic surfactant.

Furthermore, the basic catalyst used in the condensation comprises one or a plurality of compositions selected from a group consisting of the following: sodium hydroxide, potassium hydroxide, sodium bicarbonate, and sodium dihydrogen carbonate.

Furthermore, the dispensing solvent used in the condensation step can be an aqueous solution, or according to process needs, it can comprise a mixing solvent formed by mixing a hydrophilic solvent and a hydrophobic solvent. In the condensation reaction process, a large amount of dispensing solvent (such as: one or a mixture of a plurality of water, secondary water, alcohols, aromatics and alkanes) is added in order to allow the mixing solution to undergo gelation quickly under the effect of the large amount of dispensing solvent, thereby forming a wet gel and generating a large quantity of pores. The mixing ratio between the hydrophilic solvent and the hydrophobic solvent is used to control the interaction between the dispensing solvent and the mixing solution, thereby controlling the microphase separation of the droplets formed during the aggregation and bonding process. Consequently, the molecular particle size and pore distribution characteristics of the wet gel formed can be controlled.

Furthermore, in the high-temperature pulse washing step, a high-temperature pulse washing device of 50° C. to 95° C. is used to perform the aerogel wet gel particles washing process. Such device is able to provide a high temperature water of 50° C. to 95° C. for the quick replacement of the organic composition or solvent in the wet gel structure; wherein the replacement speed is faster when the temperature is higher. In addition, such device is also able to use the pulse wave acting force to accelerate the infiltration of the high temperature water into the internal of the wet gel, thereby increasing the replacement efficiency of the organic composition or solvent. Consequently, the use of the high-temperature pulse washing device is able to significantly increase the washing and replacement effect on the organic composition in the stable wet gel structure, thereby reducing the overall processing time. The high-temperature pulse washing step using the high temperature and pulse wave effect on the wet gel is able to increase the solvent replacement washing efficiency by approximately 30 to 70%. By using the example of a wet gel of a particle size of 2 mm, the washing time can be completed within approximately 10 minutes only, and the organic composition or solvent in the water and wet gel structure can be replaced until the wet gel is completely clean.

Furthermore, a conventional method under high temperature and normal pressure is used to perform drying. After drying, it is able to obtain aerogel particles with the properties of water repellent and heat insulation. The production speed can be fast and can be reduced to be completed within 24 to 30 hours. In addition, it is able to continuously manufacture and produce hydrophobic aerogel particles, thereby increasing the production efficiency.

Furthermore, the hydrophobic aerogel particles produced can be directly mixed with an inorganic fiber in a mixing machine under a mixing force to mix with each other in order to form a uniformly dispersed mixture composed of the aerogel and inorganic fiber, followed by adding an inorganic binder therein in order to allow the inorganic binder to be uniformly dispersed at the surface of the aerogel and inorganic fiber, thereby promoting the aerogel particles, the inorganic fiber and the inorganic binder to interact with each other to form a viscous aerogel composite glue, following by adding water, a thickener, a dispersant, a water repellent or an aerogel powder to adjust the property of the glue in order to obtain the finished product. In the aerogel composite glue of the present invention, the content of the aerogel is 35-50 v/v %, the content of the inorganic fiber is 10-25 v/v %, the total content of the inorganic binder solution is 35-55 v/v %. The aerogel composite glue of the present invention is of high adherence such that it can be directly filled into or coated onto metal pipes or freezer of extremely low temperature or the die casting method can be utilized to produce highly water repellent composite brick or board products composed of aerogel and inorganic fiber.

Furthermore, after drying of the composite glue, the content of the aerogel and inorganic fiber is approximately 75-95 wt %, and when it is under a low temperature environment of −200° C., it has an excellent adhesion with the material of metal or ceramic, and its thermal conductivity is 0.04-0.045 W/mK under room temperature.

Furthermore, the inorganic fiber can be one or a plurality of materials selected from a group consisting of the following: ceramic fiber, glass fiber, carbon fiber, oxidized fiber, rockwool fiber and metal oxide fiber.

Furthermore, the aerogel composite glue of the present invention can be directly applied on a fiber blanket or foamed plastic via the processing technique of coating, pressing or extrusion and filling, in order to allow the internal of the fiber blanket or foamed plastic to be filled with a large amount of composite glue composed of water repellent aerogel and inorganic fiber, following which plastic film is used for sealing, in order to produce a highly water repellent aerogel composite heat insulating blanket or a highly water repellent aerogel composite structure. Furthermore, the fiber blanket can be one or a plurality of materials selected from a group consisting of the following: organic non-woven material, glass fiber blanket, carbon fiber blanket and rockwool blanket.

Furthermore, the organic non-woven material is one or a plurality of compositions selected from a group consisting of the following: polyester non-woven material, polyolefin fiber non-woven material and nylon fiber non-woven material.

Furthermore, the foamed plastic is one or a plurality of compositions selected from a group consisting of the following: polyester foam material, polyolefin foam material, polyamide foam material, polyurethane foam material, melamine foam material and polyurea foam material.

The present invention is of the following technical effects:

1. In the condensation step, the hydrophilic solvent and the hydrophobic solvent of different ratio are used for mixing with each other to generate the effect of hydrophilic and hydrophobic mixing solvent in order to reduce the hydration of the water molecules and siloxane molecules of the mixing solution during the gelation process. Consequently, it is able to significantly prevent the contraction of the wet gel structure during the drying process in order to produce hydrophobic aerogel particles of high porosity. Accordingly, it is able to significantly enhance the heat insulation and cold resistance performance of the hydrophobic aerogel. In addition, the aerogel particle content in the mixing material can also be increased such that its practicality is increased.

2. For the hydrophobic aerogel particles obtained, the density, particle size, porosity and pore size of the aerogel particles can be controlled based on the following production criterion: the content of the alkoxysilane compound, the content of the olefin alkoxysilane compound, the content of the R-silicon oligo molecules, the content of the solvent, viscosity of the solvent, the content of the acid catalyst, the content of the basic catalyst, composition and the content of the dispersing solvent, pulse washing temperature and mixing speed.

3. In the condensation step, crushing and quick mixing are performed under large amount of aqueous solution, following which drying is performed to remove the aqueous solution. Consequently, hydrophobic aerogel particles of a particle size ranging from several hundreds of micrometers to several tenths of millimeters can be obtained. The hydrophobic wet gel with water content generated from the method of the present invention can be mixed in a substrate at a high content while maintaining high porosity in the substrate, thereby enhancing the heat insulation and cold resistance properties of various types of substrates.

4. By controlling the criterion of the pulse acting force and water temperature of the high-temperature pulse washing, the solvent replacement time of the overall wet gel can be reduced, and the production of a large quantity of hydrophobic aerogel particles can be completed within a period of time of 8 to 24 hours. Consequently, the production efficiency of aerogel is increased.

5. The hydrophobic aerogel particles produced can mix with an inorganic fiber and an inorganic binder solution to form uniformly dispersed viscous aerogel composite glue, following which water, thickener, dispersant, water repellent or aerogel powder can be added to adjust the property of the composite glue, such that it can then be directly filled into or coated onto metal pipe or freezer of extremely low temperature equipment, thereby providing the characteristics of ultra water repellent and resistance to low temperature.

6. The composite glue composed of high water repellent aerogel and inorganic fiber produced is able to withstand the low temperature of −200° C. and high temperature of 300° C., and it is of excellent properties of cold resistance at low temperature and heat insulation at high temperature. In addition, under the room temperature, its thermal conductivity is 0.035-0.042 W/mK, such that it can be provided for industrial applications. To be more specific, it is able to directly use the processing technique of coating, pressing or extrusion or filling to fill the composite glue into a fiber blanket or foam material, followed by using plastic film for sealing in order to manufacture a heat insulating blanket with high water repellent or a composite foam material with high water repellent. Consequently, it can be applied to the covering of pipes directly.

DETAILED DESCRIPTION OF THE INVENTION

Figure 1:
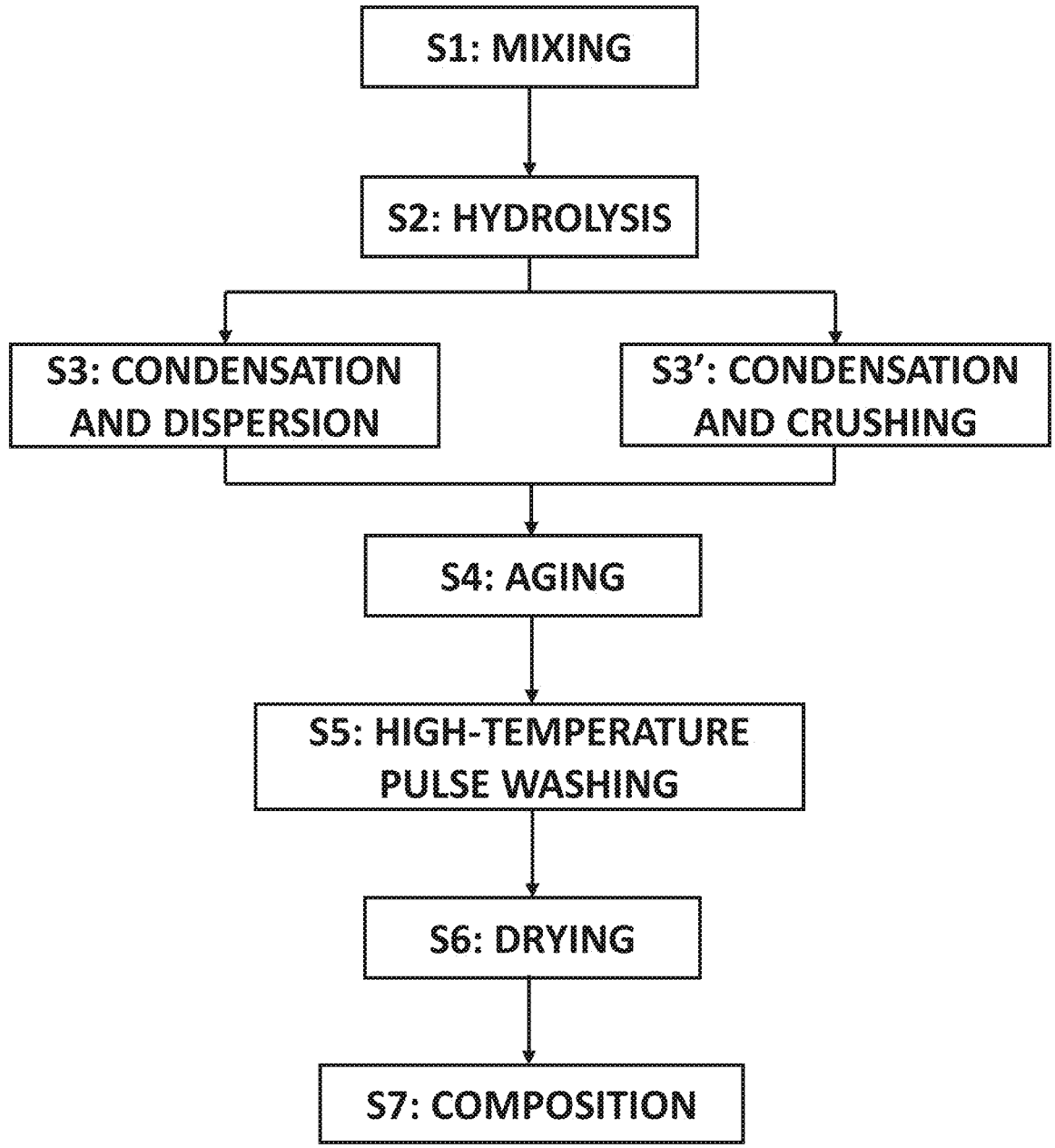
FIG. 1 is a flowchart of the method for producing a cold resisting and heat insulating composite glue composed of a hydrophobic aerogel according to an embodiment of the present invention.

Please refer to FIG. 1, showing a method for producing an ultra water repellent, cold resisting and heat insulating composite glue composed of a hydrophobic aerogel of the present invention, comprising the following steps: mixing step (S1), hydrolysis step (S2), condensation and dispersion step (S3) or condensation and crushing step (S3'), aging step (S4), high-temperature pulse washing step (S5), drying step (S6) and composition step (S7). The hydrophobic aerogel particles of several hundreds of micrometers to several tenths of millimeters produced from such method can be used to produce an ultra water repellent, cold resisting and heat insulating composite glue composed of a hydrophobic aerogel, which can be further used to manufacture a water repellent, resistant to low temperature, cold resisting and heat insulating aerogel composite brick.

Mixing step (S1): mixing one of an alkoxysilane compound, an olefin alkoxysilane compound and R-silicone oligo molecules or any mixture thereof with a mixing solvent to form a mixing solution. In addition, the alkoxysilane compound is, such as, tetramethoxysilane (TMOS) or tetraethoxysilane (TEOS); the olefin alkoxysilane compound is, such as, methyltrimethoxysilane (MTMS) or methyltriethoxysilane (MTES); the R-silicone oligo molecules refer to, such as, polydimethylsiloxane (PDMS) or silicone precursor (DMDMS); wherein the R— is linked to a functional group at a silicone molecular chain rear end, comprising: —COOH, —NH$_2$, —NH—, —NH—NH$_2$, —OH, —COH—COH, —N=C=O or —N—CO—N—; and the functional group carbon number is from C1 to C6. For calculation based on the total content of the mixing solution, the total content of the olefin alkoxysilane compound and the R-silicon oligo molecules is 3.0-40.0 mol %, and the content of the mixing solvent is 97.0-60.0 mol %.

The mixing solvent used in the mixing step (S1), comprises a first component and a second component; the first component refers to one or a plurality of substances selected from a group consisting of the following: water, alcohols, aromatics and alkanes; the second component refers to one or a plurality of substances selected from a group consisting of the following: an emulsifier or a surfactant. To be more specific, the alcohols can be, such as, ethanol; the aromatics can be, such as, toluene; the alkanes can be, such as, cyclohexane; the emulsifier can be, such as, polyvinyl alcohol; the surfactant can be, such as, cetyltrimethylammonium chloride (CTAC).

In the mixing solvent, the purpose of the addition of the surfactant is to reduce the interface tension of the water molecules. The surfactant can comprise one or a plurality of compositions selected from a group consisting of the following: cationic surfactant, anionic surfactant, zwitterionic surfactant and nonionic surfactant.

Hydrolysis step (S2): adding an acid catalyst into the mixing solution to perform a hydrolysis reaction. The ratio between the total content of the olefin alkoxysilane compound and the R-silicon oligo molecules and the content of the acid catalyst is between 1:0.5 and 1:0.00002.

Condensation and dispersion step (S3) or condensation and crushing step (S3'): adding a basic catalyst into the mixing solution to perform a condensation reaction. In the condensation reaction process, a large amount of dispensing solvent (such as: one or a mixture of a plurality of water, secondary water, alcohols, aromatics and alkanes) is added. The dispensing solvent is able to promote the mixing solution to undergo gelation quickly and to generate a wet gel structure with a large quantity of pores. The mole ratio between the acid catalyst and basic catalyst is, such as, from 1:1 to 1:4. The dispensing solvent used can be an aqueous solution, or according to process needs, it can comprise a mixing solvent formed by mixing a hydrophilic solvent and a hydrophobic solvent.

In the condensation and dispersion step (S3), before the condensation reaction is near completion, the dispensing solvent is able to allow the mixing solution to form a solution-like sol first, and in such large amount of hydrophilic dispensing solvent of an incompatible system, mixing is perform at a rotational speed of 600 rpm to 2000 rpm such that, under the acting force of the mixing, the solution-like sol can be dispersed into wet gel particles of several hundreds of nanometers and are suspended in the dispensing solvent. The volume ratio of the mixing solution and the dispensing solvent is between 1:0.5 and 1:4. In addition, as the content of the dispensing solvent is higher, the aggregation of the wet gel is lower. Furthermore, as the alkali content of the dispensing solvent is higher, the macrophase separation is more severe and the appearance of the wet gel becomes opaque; however, its structural porosity is higher, and the density is lower.

In addition, in the condensation and crushing step (S3'), before the condensation reaction is near completion, the dispensing solvent is able to allow the mixing solution to form a solution-like sol, and when it is placed stationary in a large amount of aqueous dispensing solvent of incompatible system, it is able to undergo gelation and curing, allowing the silicon molecules in the mixing solution to aggregate into wet gel particles of several hundreds of nanometers, following which they are further aggregated to form wet gel of a three-dimensional network structure and suspended in the dispensing solvent. Next, the wet gel of the three-dimensional network structure in the large amount of aqueous dispensing solvent is crushed such that the wet gel is crushed into particles of a particle size ranging from several hundreds of micrometers to several tenths of millimeters, and are dispersed in the aqueous dispensing solvent. The volume ratio of the mixing solution and the dispensing solvent is between 1:0.5 and 1:4. In addition, as the content of the dispensing solvent is higher, the aggregation of the wet gel subsequently produced is lower. As the alkali content of the dispensing solvent is higher, the macrophase separation is more severe and the appearance of the wet gel becomes opaque; however, its porosity is higher, and the density is lower.

Aging step (S4): performing aging when the hydrophobic aerogel wet gel is under a specific temperature in order to stabilize the hydrophobic aerogel wet gel structure. The aging temperature is, such as from 35-80° C., and preferably from 40-50° C.

High-temperature pulse washing step (S5): using a high-temperature pulse washing device of a temperature between 50-95° C. to perform washing on the aerogel wet gel. In addition, such high-temperature pulse washing device uses high temperature water of a temperature between 50-95° C. to perform replacement of the organic compositions and solvent in the wet gel structure. Furthermore, a driving force generated from the combination of the temperature gradient and concentration gradient is used to perform washing on the organic substance or solvent in the wet gel structure. In addition, the water temperature needs to be increased gradually. In general, as the water temperature is higher, the replacement speed is faster. Moreover, the use of the pulse wave acting force is also able to accelerate the water molecules to infiltrate into the wet gel particles in order to increase the replacement efficiency of the organic composition or solvent. In general, the use of such high-temperature pulse washing device is able to significantly increase the replacement and washing effect on the organic composition and solvent in the aerogel wet gel. Furthermore, as the acting force frequency of the pulse is higher or the amplitude distance is larger, then the washing effect is higher. Moreover, the combination of the temperature effect and the pulse wave effect is able to reduce the overall process time of the aerogel. The solvent replacement washing efficiency of such high-temperature pulse washing step can be increased by approximately 30% to 70%. For aerogel wet gel particles having a particle size of 2 mm, the washing time requires approximately 10 minutes only to replace the aerogel particles to a completely clean state.

Accordingly, porous hydrophobic aerogel particles of a particle size ranging from several hundreds of nanometers to several tenths of millimeters can be produced. In addition, when the hydrophobic aerogel particles are not yet dried, they can be mixed with a hydrophilic substrate, such as: cement, cement paint, or aqueous bonding agent, thereby increasing the application value of the aerogel particles. Particularly, the hydrophobic aerogel particles can be used as a raw material for a low temperature cold resisting composite material or a low temperature aerogel heat insulating blanket, in order to achieve the effect of heat insulating and cold resisting aerogel.

Drying step (S6): after high-temperature distillation is used to remove the remaining hydrophobic solvent or filter is used to remove the aforementioned remaining solvent, performing quick drying under the condition of temperature between 90-160° C. and under normal pressure, in order to obtain hydrophobic aerogel particles of a high density. Furthermore, a fluidized bed dryer, a constant temperature oven, a drum dryer, a mixing dryer, or a vacuum dryer at a temperature between 90-250° C. can be used to dry the aerogel particles in order to accelerate the drying speed. For example, the high-temperature distillation temperature is, such as, between 90-250° C.

Composition step (S7): using a mixing machine to mix the dried aerogel particles with an inorganic fiber with each other in order to form a uniformly dispersed inorganic mixture, followed by adding an inorganic binder solution into the inorganic mixture in order to allow the aerogel particles, the inorganic fiber and the inorganic binder solution to interact with each other to form a composite glue composed of the aerogel with a viscosity.

Figure 2:
FIG. 2 is a photo image showing the outer appearance of the submicron hydrophobic aerogel particles produced based on the method of the present invention.
Figure 3:
FIG. 3 is a photo image showing the outer appearance of the hydrophobic aerogel particles of several millimeters produced based on the method of the present invention.

Please refer to FIG. 2 and FIG. 3, the outer appearance hydrophobic aerogel particles of different sizes observed from a conventional camera is illustrated, and it can be clearly seen that these particles have different particle size.

Figure 4:
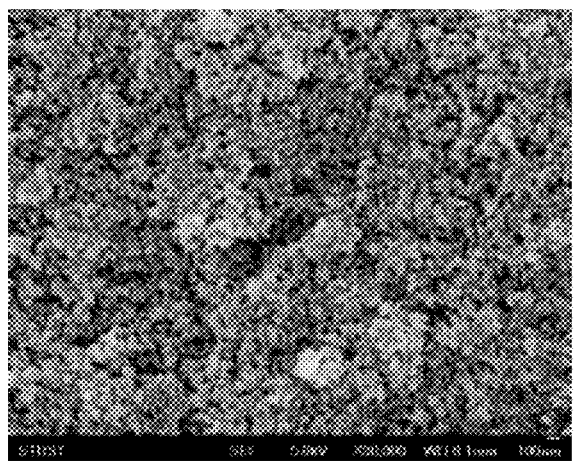
FIG. 4 is a scanning electronic microscope photo image showing the hydrophobic aerogel particles of several millimeters produced based on the method of the present invention.
Figure 4:
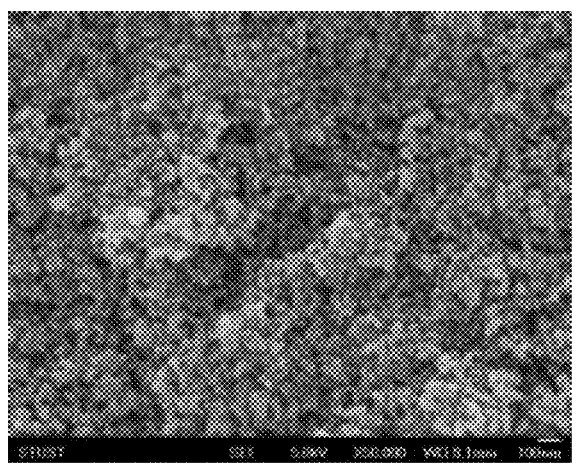
Figure 4:
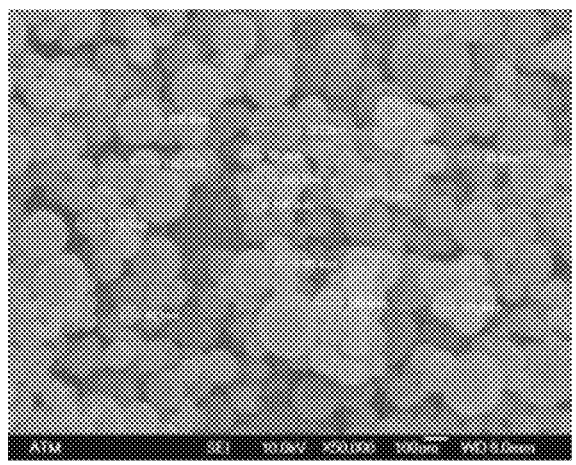

Please continue to refer to FIG. 4, a photo image of the hydrophobic aerogel particles of several hundreds of micrometers under a scanning electronic microscope is shown. It can be seen that the hydrophobic aerogel particles are formed by a large quantity of aerogel particles of a particle size ranging from approximately several tenths of nanometers to several hundreds of nanometers, and a large quantity of pore structures are generated.

Figure 5:
FIG. 5 is a photo image showing the cold resisting, heat insulating and water repellent aerogel brick produced based on the method of the present invention floating on water.

Please continue to refer to FIG. 5, a photo image of the water repellent, cold resisting and heat insulating aerogel brick produced floating on water is shown. It can be seen that approximately 80% of the volume is above the water, and is completely water repellent, proving that it is of excellent property of water repellent and has a low density.

Figure 6:
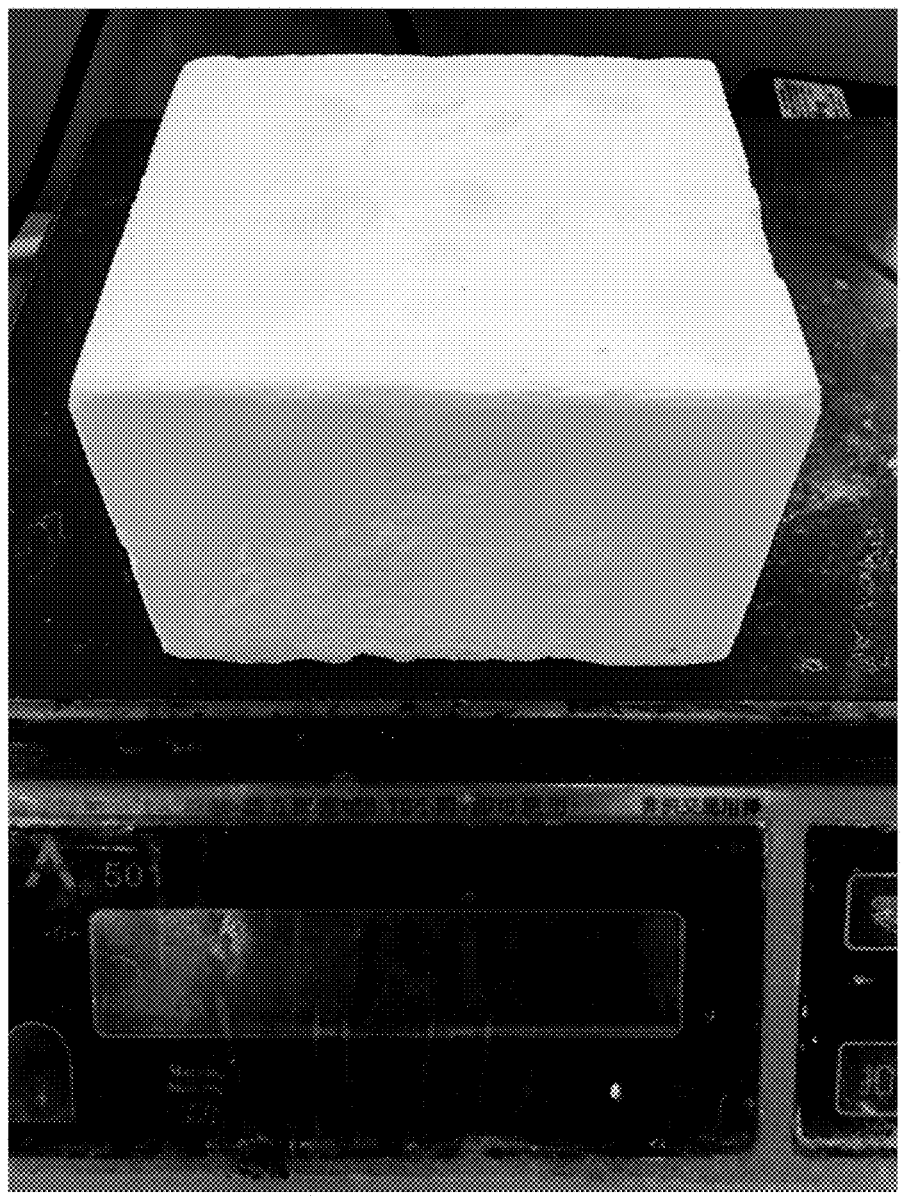
FIG. 6 is a photo image showing the cold resisting, heat insulating and water repellent aerogel brick cut into a volume of 10.5 cm×10.5 cm×7.8 cm produced based on the method of the present invention.

Please continue to refer to FIG. 6, a photo image of the water repellent, cold resisting and heat insulating aerogel brick cut into a volume of 10.5 cm×10.5 cm×7.8 cm is shown. It can be seen that its weight is 144.4 g. In other words, the density of the water repellent, cold resisting and heat insulating aerogel brick is approximately 0.168 g/cm$^3$, demonstrating that it is of the characteristics of light weight and heat insulation effect.

Figure 7:
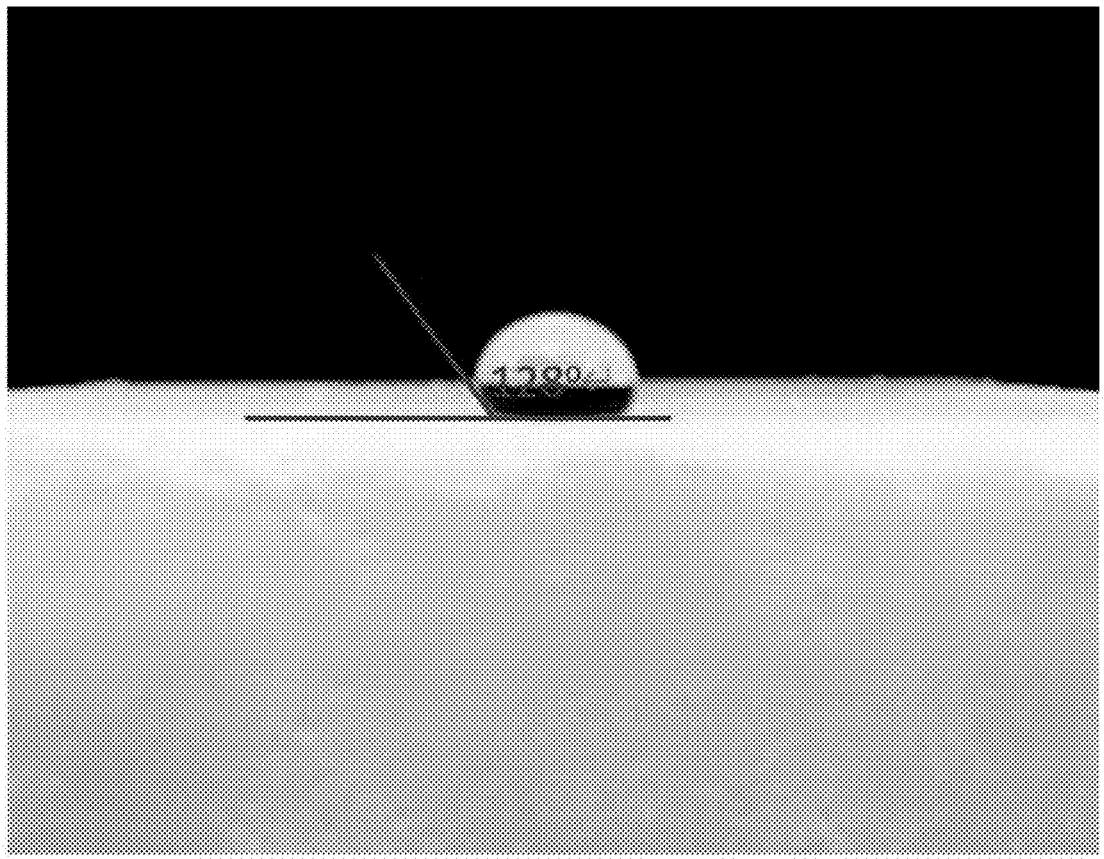
FIG. 7 is a photo image showing the cold resisting, heat insulating and water repellent aerogel brick produced based on the method of the present invention with respect to the water drop interface angle.

Please continue to refer to FIG. 7, a photo image of the interface angle of the water drop on the surface of the water repellent, cold resisting and heat insulating aerogel brick is shown. It can be seen that the surface water drop interface angle on the surface the heat insulating brick is approximately 128 degree, demonstrating that it has an excellent water repellent effect.

In view of the descriptions of the aforementioned embodiments, the manufacturing, application and technical effects of the present invention can be sufficiently understood. However, it shall be noted that the aforementioned embodiments refer to the preferred embodiments of the present invention only such that they shall not be used to limit the scope of the present invention, i.e. All simple equivalent changes and modifications made based on the claims and the content of the description of the present invention shall be considered to be within the scope of the present invention.

What is claimed is:

1. A method for producing a composite glue composed of a hydrophobic aerogel, comprising:
    a mixing step: mixing an alkoxysilane compound, an alkyl-substituted alkoxysilane compound, an R-silicone oligo molecule or any mixture thereof with a mixing solvent to form a mixing solution; wherein the alkyl-substituted alkoxysilane compound is methyltrimethoxysilane (MTMS) or methyltriethoxysilane (MTES); wherein the R— is a functional group linked to a silicone molecular chain rear end, the R— comprises: —COOH, —NH$_2$, —NH—, —NH—NH$_2$, —OH, —N=C=O or —N—CO—N—, and a carbon number of the R— is from C1 to C6;
    a hydrolysis step: adding an acid catalyst into the mixing solution to perform a hydrolysis reaction;
    a condensation step: adding a basic catalyst into the mixing solution to perform a condensation reaction; wherein in the condensation reaction process, a dispersing solvent is added into the mixing solution at a volume ratio of the mixing solution and the dispersing solvent between 1:0.5 and 1:4, and the mixing solution is mixed at a high speed to allow the mixing solution to form an aerogel wet gel of a uniform structure and having a particle size ranging from several hundreds of nanometers to several hundreds of micrometers; or wherein in the condensation reaction, a dispersing solvent is added into the mixing solution at a volume ratio of the mixing solution and the dispersing solvent between 1:0.5 and 1:4 therein to allow the mixing solution to form an aerogel wet gel of a uniform structure, followed by crushing the aerogel wet gel in order to crush the aerogel wet gel into particles of a particle size ranging from several hundreds of micrometers to several tenths of millimeters and being dispersed into the dispersing solvent;
    an aging step: performing aging on the aerogel wet gel under a specific temperature in order to stabilize the aerogel wet gel;
    a high-temperature pulse washing step: using a pulse acting force of a high temperature water under a normal pressure to replace an organic component or solvent in the aerogel wet gel until the aerogel wet gel indicates a milky color;
    a drying step: using high-temperature distillation to remove or using a filter to remove the solvent, followed by performing high-temperature drying on the aerogel wet gel in order to obtain hydrophobic aerogel dried gel particles having a high porosity and a high specific surface area; and
    a composition step: using a mixing machine to mix the hydrophobic aerogel dried gel particles with an inorganic fiber to interact with each other in order to form a uniformly dispersed inorganic mixture, followed by adding an inorganic binder solution into the inorganic mixture in order to allow the aerogel particles, the inorganic fiber and the inorganic binder solution to interact with each other to form a composite glue composed of the aerogel with a viscosity; wherein the inorganic binder solution comprises one or a plurality of compounds selected from the group consisting of the following: phosphate, silicate, sulfate, borate and metal oxide; the phosphate refers to zirconium phosphate, phosphoric acid-copper oxide; the silicate refers to aluminum silicate or sodium silicate; the metal oxide refers to an oxide containing a copper, aluminum, zirconium, yttrium or lanthanum element.

2. The method for producing a composite glue composed of a hydrophobic aerogel according to claim 1, wherein the alkoxysilane compound is tetramethoxysilane (TMOS) or tetraethoxysilane (TEOS); the R-silicone oligo molecule refers to polydimethylsiloxane (PDMS).

3. The method for producing a composite glue composed of a hydrophobic aerogel according to claim 1, wherein the mixing solvent is water, deionized water, ethanol, toluene, n-hexane, cyclohexane, polyvinyl alcohol or hexadecyl trimethyl ammonium chloride.

4. The method for producing a composite glue composed of a hydrophobic aerogel according to claim 1, wherein the mixing solvent comprises a first component and a second component; the first component comprises one or a plurality of substances selected from the group consisting of the following: water, alcohols, aromatics and alkanes; the second component comprises one or a plurality of substances selected from the group consisting of the following: an emulsifier and a surfactant; the surfactant comprises a cationic surfactant, an anionic surfactant, a zwitterionic surfactant or a nonionic surfactant.

5. The method for producing a composite glue composed of a hydrophobic aerogel according to claim 1, wherein the dispersing solvent used in the condensation step comprises one of or a mixture of a plurality of water, secondary water, alcohols, aromatics and alkanes.

6. The method for producing a composite glue composed of a hydrophobic aerogel according to claim 1, wherein the water temperature in the high-temperature pulse washing step is between 50 and 95° C.

7. The method for producing a composite glue composed of a hydrophobic aerogel according to claim 1, wherein in the drying step, the high-temperature distillation removal refers to a quick drying under a condition of a temperature between 90 and 160° C. and normal pressure; wherein the high-temperature drying refers to using a fluidized bed dryer, a constant temperature oven, a drum dryer, a mixing dryer, a spray dryer or a vacuum dryer at a temperature between 90 and 250° C. to perform drying.

8. The method for producing a composite glue composed of a hydrophobic aerogel according to claim 1, wherein the inorganic fiber comprises one or a plurality of materials selected from the group consisting of the following: ceramic fiber, glass fiber, carbon fiber, oxidized fiber, rockwool fiber and metal oxide fiber.

9. A method for producing a composite glue composed of a hydrophobic aerogel, comprising:
    a mixing step: mixing an alkoxysilane compound, an alkyl-substituted alkoxysilane compound, an R-silicone oligo molecule or any mixture thereof with a mixing solvent to form a mixing solution; wherein the alkyl-substituted alkoxysilane compound is methyltrimethoxysilane (MTMS) or methyltriethoxysilane (MTES); wherein the R— is a functional group linked to a silicone molecular chain rear end, the R— comprises: —COOH, —NH$_2$, —NH—, —NH—NH$_2$, —OH, —N=C=O or —N—CO—N—, and a carbon number of the R— is from C1 to C6;

a hydrolysis step: adding an acid catalyst into the mixing solution to perform a hydrolysis reaction;

a condensation step: adding a basic catalyst into the mixing solution to perform a condensation reaction; wherein in the condensation reaction, a dispersing solvent is added into the mixing solution at a volume ratio of the mixing solution and the dispersing solvent between 1:0.5 and 1:4, and the mixing solution is mixed at a high speed to allow the mixing solution to form an aerogel wet gel of a uniform structure and having a particle size ranging from several hundreds of nanometers to several hundreds of micrometers; or wherein in the condensation reaction, a dispersing solvent is added into the mixing solution at a volume ratio of the mixing solution and the dispersing solvent between 1:0.5 and 1:4 to allow the mixing solution to form an aerogel wet gel of a uniform structure, followed by crushing the aerogel wet gel in order to crush the aerogel wet gel into particles of a particle size ranging from several hundreds of micrometers to several tenths of millimeters and being dispersed into the dispersing solvent;

an aging step: performing aging on the aerogel wet gel under a specific temperature in order to stabilize the aerogel wet gel;

a high-temperature pulse washing step: using a pulse acting force of a high temperature water under a normal pressure to replace an organic component or solvent in the aerogel wet gel until the aerogel wet gel indicates a milky color;

a drying step: using high-temperature distillation to remove or using a filter to remove the solvent, followed by performing high-temperature drying on the aerogel wet gel in order to obtain hydrophobic aerogel dried gel particles having a high porosity and a high specific surface area; and a composition step: using a mixing machine under a mixing force to mix the hydrophobic aerogel dried gel particles directly with an inorganic fiber to form a uniformly dispersed inorganic mixture, followed by adding an inorganic binder into the inorganic mixture in order to allow the aerogel particles, the inorganic fiber and the inorganic binder to interact with each other to form a viscous aerogel composite glue, followed by adding a water, a thickener, a dispersant, or an aerogel powder to adjust the viscosity of the aerogel composite glue; wherein the inorganic binder comprises one or a plurality of compounds selected from the group consisting of the following: phosphate, silicate, sulfate, borate and metal oxide; the phosphate refers to zirconium phosphate, phosphoric acid-copper oxide; the silicate refers to aluminum silicate or sodium silicate; the metal oxide refers to an oxide containing a copper, aluminum, zirconium, yttrium or lanthanum element.

10. The method for producing a composite glue composed of a hydrophobic aerogel according to claim 9, wherein the alkoxysilane compound is tetramethoxysilane (TMOS) or tetraethoxysilane (TEOS); the R-silicone oligo molecule refers to polydimethylsiloxane (PDMS).

11. The method for producing a composite glue composed of a hydrophobic aerogel according to claim 9, wherein the mixing solvent is water, deionized water, ethanol, toluene, n-hexane, cyclohexane, polyvinyl alcohol or hexadecyl trimethyl ammonium chloride.

12. The method for producing a composite glue composed of a hydrophobic aerogel according to claim 9, wherein the mixing solvent comprises a first component and a second component; the first component comprises one or a plurality of substances selected from the group consisting of the following: water, alcohols, aromatics and alkanes; the second component comprises one or a plurality of substances selected from the group consisting of the following: an emulsifier and a surfactant; the surfactant comprises a cationic surfactant, an anionic surfactant, a zwitterionic surfactant or a nonionic surfactant.

13. The method for producing a composite glue composed of a hydrophobic aerogel according to claim 9, wherein the dispersing solvent used in the condensation step comprises one of or a mixture of a plurality of water, secondary water, alcohols, aromatics and alkanes.

14. The method for producing a composite glue composed of a hydrophobic aerogel according to claim 9, wherein the water temperature in the high-temperature pulse washing step is between 50 and 95° C.

15. The method for producing a composite glue composed of a hydrophobic aerogel according to claim 9, wherein in the drying step, the high-temperature distillation removal refers to a quick drying under a condition of a temperature between 90 and 160° C. and normal pressure; wherein the high-temperature drying refers to using a fluidized bed dryer, a constant temperature oven, a drum dryer, a mixing dryer, a spray dryer or a vacuum dryer at a temperature between 90 and 250° C. to perform drying.

16. The method for producing a composite glue composed of a hydrophobic aerogel according to claim 11, wherein the inorganic fiber comprises one or a plurality of materials selected from the group consisting of the following: ceramic fiber, glass fiber, carbon fiber, oxidized fiber, rockwool fiber and metal oxide fiber.

\* \* \* \* \*